US012773931B2

(12) United States Patent
Guo et al.

(10) Patent No.: US 12,773,931 B2
(45) Date of Patent: Oct. 27, 2026

(54) SIDE IMPACT PROTECTING BLOCK AND CHILD SAFETY SEAT WITH THE SAME

(71) Applicant: Wonderland Switzerland AG, Steinhausen (CH)

(72) Inventors: Zhengwen Guo, Dongguan (CN); Ruyi Li, Dongguan (CN); Yingzhong Chen, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 100 days.

(21) Appl. No.: 18/848,437

(22) PCT Filed: Mar. 21, 2023

(86) PCT No.: PCT/EP2023/057221

§ 371 (c)(1),
(2) Date: Sep. 18, 2024

(87) PCT Pub. No.: WO2023/180326

PCT Pub. Date: Sep. 28, 2023

(65) Prior Publication Data

US 2025/0214491 A1 Jul. 3, 2025

(30) Foreign Application Priority Data

Mar. 22, 2022 (CN) ......................... 202210286115.6

(51) Int. Cl.
*B60N 2/28* (2006.01)
*B60N 2/42* (2006.01)

(52) U.S. Cl.
CPC ......... *B60N 2/2884* (2013.01); *B60N 2/4235* (2013.01)

(58) Field of Classification Search
CPC ............................ B60N 2/4235; B60N 2/2884
See application file for complete search history.

(56) References Cited

U.S. PATENT DOCUMENTS

2015/0336482 A1 11/2015 Pos
2021/0146809 A1 5/2021 Cui
2021/0284049 A1 9/2021 Mo et al.

FOREIGN PATENT DOCUMENTS

CN 207190848 U 4/2018
CN 207360133 U 5/2018
(Continued)

OTHER PUBLICATIONS

"Reexamination 1st Office Action Issued in Corresponding Taiwanese Patent Application No. 112110526", Mailed Date: Nov. 8, 2024, 7 pages.

(Continued)

*Primary Examiner* — Milton Nelson, Jr.
(74) *Attorney, Agent, or Firm* — Volpe Koenig

(57) ABSTRACT

The present disclosure provides a side impact protecting block according to the present application, configured to be detachably installed to a child safety seat, the side impact protecting block comprising a housing, a slider and an engagement member. The slider is at least partially accommodated in the housing, and operable from outside of the housing to slide along a first direction of the housing. The engagement member is accommodated in the housing, and movable between a locked position protruding out of the housing and a release position retracting into the housing along a second direction of the housing intersecting with the first direction, wherein sliding of the slider along the first direction drives the engagement member to move between the locked position and the release position.

19 Claims, 12 Drawing Sheets

(56) References Cited

FOREIGN PATENT DOCUMENTS

| | | | | |
|---|---|---|---|---|
| CN | 210011644 | U | 2/2020 | |
| CN | 214689145 | U | 11/2021 | |
| CN | 113895326 | A | 1/2022 | |
| DE | 202012102471 | U1 * | 9/2012 | ............... B60N 2/28 |
| JP | 2015521558 | A | 7/2015 | |
| JP | 2023533276 | A | 8/2023 | |
| TW | 567955 | U | 12/2003 | |
| WO | 2022007605 | A1 | 1/2022 | |

OTHER PUBLICATIONS

Japan Patent Office. Search Report for corresponding application JP2024-554994, dated Nov. 26, 2025. 96 pages.
Japan Patent Office. Office Action for corresponding application JP2024-554994, dated Dec. 2, 2025. 4 pages.
Office Action issued in corresponding Taiwanese Application No. 112110526 dated Dec. 15, 2023.
International Search Report and Written Opinion issued in corresponding Application No. PCT/EP2023/507221 dated Jun. 13, 2023.

* cited by examiner

SIDE IMPACT PROTECTING BLOCK AND CHILD SAFETY SEAT WITH THE SAME

CROSS-REFERENCE TO RELATED APPLICATIONS

This application is a National Stage application of PCT/EP2023/057221, entitled "SIDE IMPACT PROTECTING BLOCK AND CHILD SAFETY SEAT WITH THE SAME" and filed on Mar. 21, 2023, which claims the benefit of Chinese Application No. 202210286115.6, filed on Mar. 22, 2022, both of which are incorporated herein by reference in their entirety.

TECHNICAL FIELD

The present disclosure relates to a side impact protecting block and a child safety seat including the side impact protecting block.

BACKGROUND

A child safety seat is a device configured on a car seat to protect a baby, which restrains the baby through a restraint device. In the case of emergency brake or accidental collision of the car, the child safety seat reduces the impact on the baby through its housing, and restricts the body movement of the baby through the restraint device, so as to reduce the chance of the baby being injured in an accident and ensure the safety of the baby during riding.

Usually, a side impact protecting structure is laterally protruded from a side wing of the child safety seat, and in the case of a side collision of the car, the impact is reduced through a buffer effect produced by the side wing of the child safety seat and the side impact protecting structure provided on it so as to protect the body and head of the baby in the lateral direction, however it may take up relatively large lateral space to provide the side impact protecting structure on the side wing, which is inconvenient for the storage of the child safety seat.

SUMMARY

A side impact protecting block according to present application, configured to detachably be installed to a child safety seat, wherein the side impact protecting block includes: a housing; a slider, at least partially accommodated in the housing, and operable from outside of the housing to slide along a first direction of the housing; and an engagement member, accommodated in the housing, and movable between a locked position protruding out of the housing and a release position retracting into the housing along a second direction of the housing intersecting with the first direction; wherein sliding of the slider along the first direction drives the engagement member to move between the locked position and the release position.

In one embodiment, the housing includes an insertion portion at its first housing end along the first direction, and the housing is inserted into a side of the child safety seat through the insertion portion; and the engagement member is located in the insertion portion, and protrudes out of the housing through an engagement hole opened on a side wall of the insertion portion.

In one embodiment, the engagement member has a spherical shape, and a diameter of the engagement hole is less than a spherical diameter of the engagement member.

In one embodiment, the insertion portion has a rectangular cross-section, and the engagement holes dislocated along the first direction are respectively opened on two opposite side walls, the engagement member being provided at a corresponding engagement hole.

In one embodiment, the slider has a first slider end engaged to the engagement member and a second slider end for external operation along the first direction; and sliding of the slider toward the first slider end along the first direction drives the engagement member to move from the locked position to the release position.

In one embodiment, the slider includes an abutting portion and an avoidance portion adjacent along the first direction at the first slider end, and the abutting portion is closer to a tail end of the first slider end than the avoidance portion; wherein as the slider slides, the abutting portion or the avoidance portion corresponds to a position of the engagement hole; wherein when the abutting portion is located in a position corresponding to the engagement hole, the engagement member is pushed against to protrude to the locked position; and when the avoidance portion is located in the position corresponding to the engagement hole, the engagement member is allowed to retract to the release position.

In one embodiment, the housing is opened with a first opening at a second housing end opposite to the first housing end along the first direction, so as to allow to the slider to be pushed from outside through the first opening.

In one embodiment, the side impact protecting block further includes a button; the housing is opened with a second opening at the second slider end on its side wall, the button is movably disposed at the second opening along the second direction relative to the housing, so as to allow the button to be pushed from outside through the second opening; and a slider bevel is provided at the second slider end, the button is provided with a button bevel, and the button bevel abuts against the slider bevel to change a movement of the button along the second direction into a movement of the slider along the first direction.

In one embodiment, the abutting portion of the slider is wrapped by or made of a metal reinforcement; an outer surface of the insertion portion of the housing is wrapped by or made of a metal reinforcing sheet; and the engagement member is a metallic ball.

In one embodiment, an elastic member is further provided in the housing; the elastic member is provided between the housing and the slider, being configured to bias the slider toward the second slider end.

In one embodiment, the housing includes a block provided around the slider, the block is provided with a channel for the slider to move along the first direction, and an elastic member accommodation portion protruding inward along the second direction is provided in the channel; an elastic member abutting portion protruding outward along the second direction is provided at the second slider end; and the elastic member is provided between the elastic member accommodation portion and the elastic member abutting portion.

In one embodiment, the first direction is substantively perpendicular to a side of the seat, and the second direction is substantively parallel to a side of the seat.

In one embodiment, a ratio of an overall width W in the second direction to an overall length L in the first direction, of the side impact protecting block, is between 1:4 and 1:5; a ratio of an overall width W of the side impact protecting block to an overall thickness H of the side impact protecting block is between 1:1.5 and 1:2; and a ratio of a sectional area S2 of the engagement member in a direction perpendicular to the first direction to an overall sectional area S of the side impact protecting block in a direction perpendicular to the first direction is greater than 1:45.

In one embodiment, a ratio of a length L1 of the insertion portion in the first direction to an overall length L of the side impact protecting block in the first direction is less than or equal to 1:10; and a ratio of a sectional area S1 of the insertion portion in a direction perpendicular to the first direction to an overall sectional area S of the side impact protecting block in a direction perpendicular to the first direction is between 1:6 and 1:7.

In one embodiment, the first direction is the longitudinal direction of the side impact protecting block.

In one embodiment, the slider pushes the engagement member along the second direction when the engagement member is in the locked position.

A child safety seat according to the present application, including: a base, configured to fix the child safety seat to a vehicle; a seat, for a child to seat on, and at least one side impact protecting blocks according to the present application, detachably installed on one side or both sides of the seat.

In one embodiment, each side of the seat is provided with a mount for installing the side impact protecting block, and each mount is recessed toward inside of the seat along the first direction, so that an insertion portion of the side impact protecting block is inserted into and located in the mount; and an engagement groove recessed inward along the second direction is provided on an inner wall of a recessed portion at a position close to an open end of the recessed portion of the mount, and a position of the engagement groove is provided corresponding to a position of the engagement member, wherein when the engagement member is located in its locked position, the engagement member is inserted into the engagement groove and is stopped at the open end, thereby fixing the side impact protecting block to the seat; and when the engagement member is located in the release position, the engagement member retracts into the housing and is free from stopping by the open end.

In one embodiment, a metal reinforcing sheet is provided on one side where the open end of the mount stops the engagement member in the locked position.

BRIEF DESCRIPTION OF THE DRAWINGS

Hereinafter, embodiments of the present application will be further described in detail with reference to the accompanying drawings, in which.

DETAILED DESCRIPTION

While the disclosure has been illustrated and described herein with reference to particular embodiments, the disclosure should not be limited to the details shown. Rather, various modifications may be made to these details, within the scope of equivalents of the claims and without departing from the disclosure.

The descriptions of “front”, “rear”, “upper” and “lower” herein are only for the convenience of understanding, the present disclosure is not limited to these directions, but may be adjusted according to actual situations. Although the application has been described with reference to the enumeration of typical embodiments, the terms used are descriptive and exemplary, rather than limited.

Figure 1:
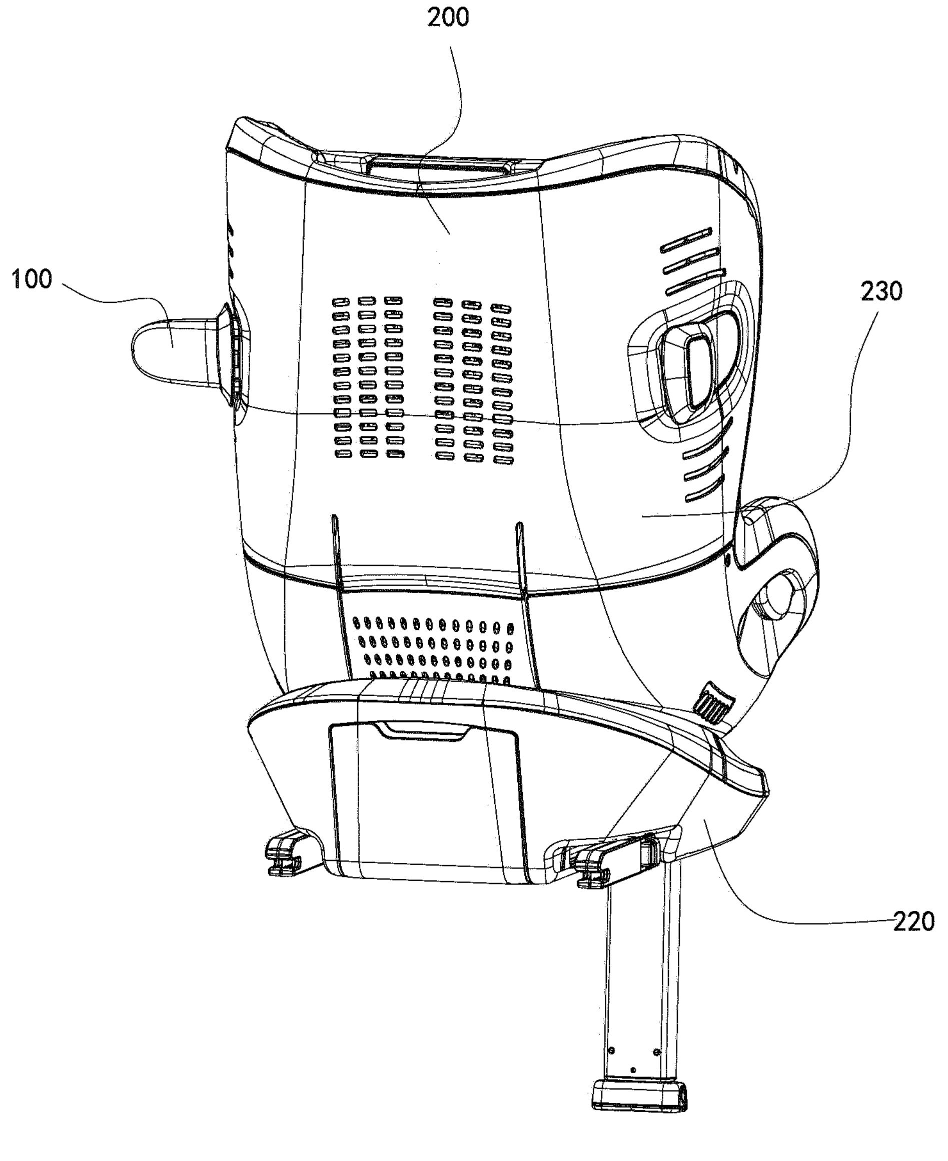
FIG. 1 is a perspective view of a child safety seat according to the present application, and a side impact protecting block is installed on one side of the child safety seat.
Figure 2:
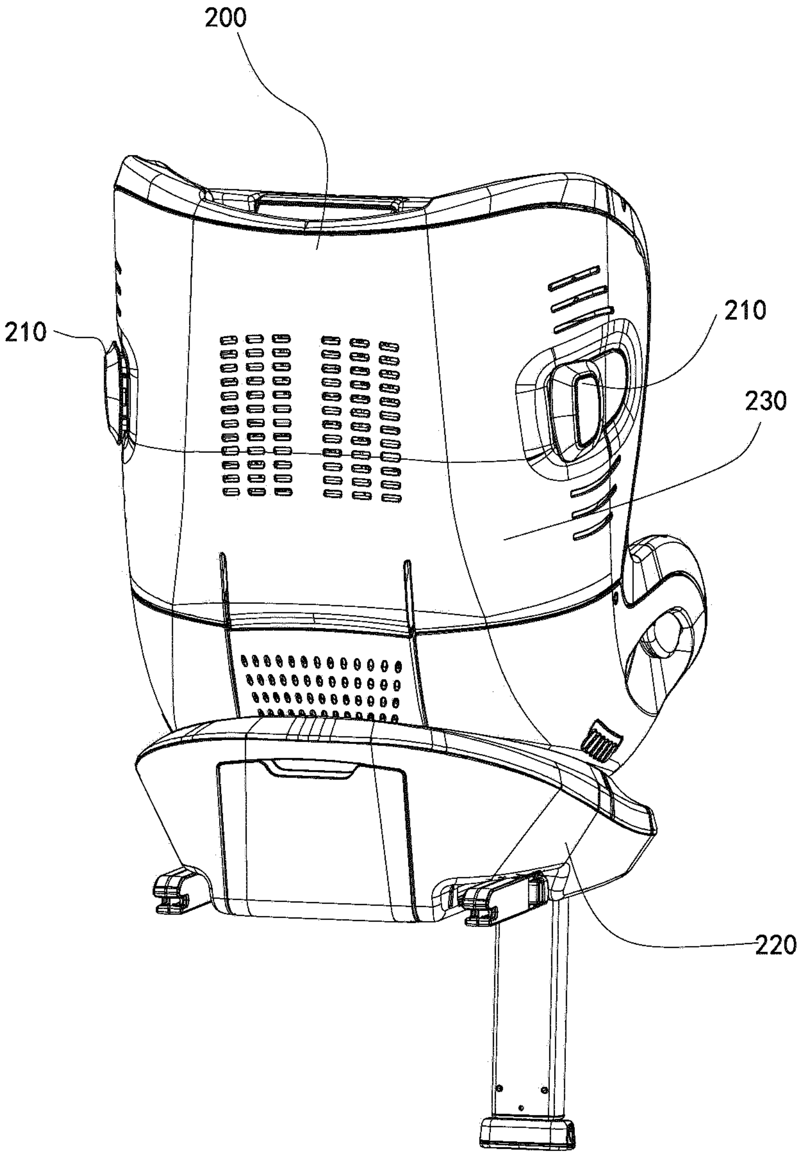
FIG. 2 is a perspective view of the child safety seat according to the present application, in which the side impact protection block is removed.
Figure 3:
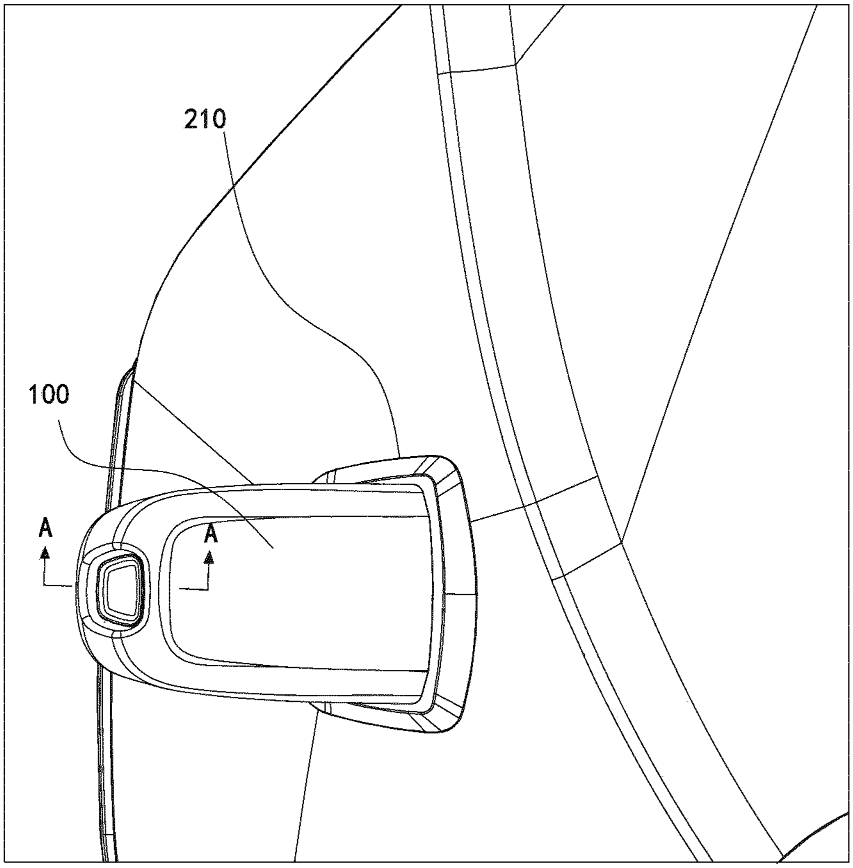
FIG. 3 is a partially enlarged perspective view of the child safety seat and the side impact protecting block installed thereon according to the present application.
Figure 4:
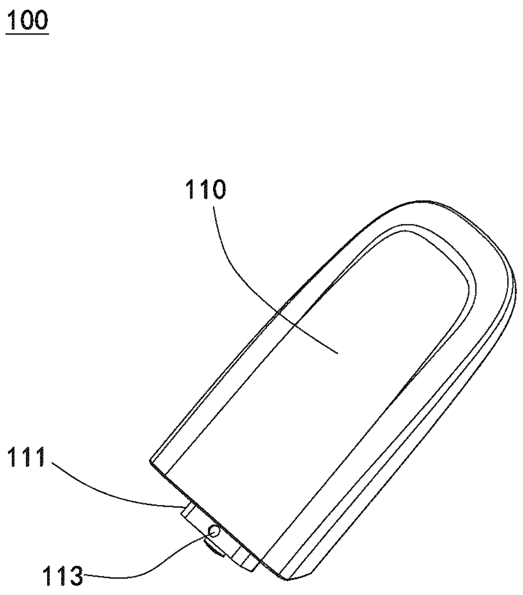
FIGS. 4 and 5 are perspective views of the side impact protecting block according to the first embodiment of the present application from different angles.

The child safety seat 200 according to the present application will be generally described with reference to FIGS. 1 to 3. FIGS. 1 and 2 show rear perspective views of the child safety seat 200. It can be seen that the child safety seat 200 includes a base 220 and a seat 230, wherein the base 220 is configured to fix to a vehicle, e.g., car, and the seat 230 is for a child to sit on. Each side of the child safety seat 200 is provided with a mount 210. A side impact protecting block 100 may be inserted into either mount 210 so as to be mounted to the child safety seat 200. Of course, the two side impact protecting blocks 100 may also be inserted into the mounts 210 on both sides, respectively. However, in normal use, the side impact protecting block 100 is inserted only on the side of the child safety seat 200 close to the inner wall of the vehicle. When the side impact protecting block 100 is not needed, the side impact protecting block 100 may be removed from the seat, as will be described in detail below.

In the embodiment of the present application, the side impact protecting block 100 is inserted into the mount 210 of the seat at an angle substantially perpendicular to the side of the seat. However, in other embodiments, the side impact protecting block 100 may also be inserted into the mount 210 at an angle inclined to the side of the seat.

The structure of the side impact protecting block 100 according to the first embodiment of the present application and the mount 210 matching with it will be described with reference to FIGS. 4 to 9.

The side impact protecting block 100 includes: a housing 110, a slider 120, and an engagement member 130. The housing 110 at least partially accommodates other components of the side impact protecting block 100. The side impact protecting block 100 is fixed to the seat through the form fit between the housing 110 and the mount 210 of the seat. The slider 120 is slidably disposed in the housing 110, and the user moves the engagement member 130 in the housing 110 by operating the slider 120. The side impact protecting block 100 is locked to the seat or released from the seat by the engagement member 130. The side impact protecting block 100 may further include an elastic member 140 for resetting the slider 120.

More specifically, the housing 110 may have a substantially rectangular shape. The housing 110 has an insertion portion 111 at the first housing end (an insertion end) along its longitudinal direction, i.e., the first direction, the second end (a free end) opposite to the first housing end along the longitudinal direction is configured to abut against a vehicle e.g., a car. The insertion portion 111 is form fitted into the mount 210. In one embodiment, the insertion portion 111 has a rectangular cross-section, and engagement holes 113 dislocated along the longitudinal direction are respectively provided on two opposite side walls, an engagement member 130 being respectively disposed at a respective engagement hole 113. In other embodiments, the insertion portion 111 may have other shapes, for example, have a triangular or trapezoidal cross-section, as long as it can form fit with the mount 210. The engagement hole 113 may be formed on one or more sides of the insertion portion 111, and an engagement member 130 may be respectively disposed at each engagement hole 113. In this embodiment, a plurality of engagement holes 113 are dislocated along the longitudinal direction. However, the present application is not limited thereto, and in other embodiments, the plurality of engagement holes 113 may be aligned along the longitudinal direction.

In one embodiment, the housing 110 includes a block 115 provided around the slider 120. The block 115 is provided with a channel for the longitudinal movement of the slider 120, and an elastic member placement portion transversely, i.e., in the second direction, inward protruding is provided in the channel. The block 115 is configured to limit the sliding direction of the slider 120 and reduce frictional resistance between the slider 120 and the housing 110. In other embodiments, a sliding rail may be provided inside the housing 110 to replace the function of the block 115.

Although the first direction and the second direction of the side impact protecting block 100 are described with the longitudinal direction and the transverse direction in the present application, it should be understood that the first direction and the second direction are not necessarily perpendicular to each other, but may intersect at an angle. In one embodiment, the first direction is substantially perpendicular to the side of the seat 230 and the second direction is substantially parallel to the side of the seat 230. In other embodiments, the first direction and the second direction may be inclined to the side of the seat 230, respectively.

Figure 8:
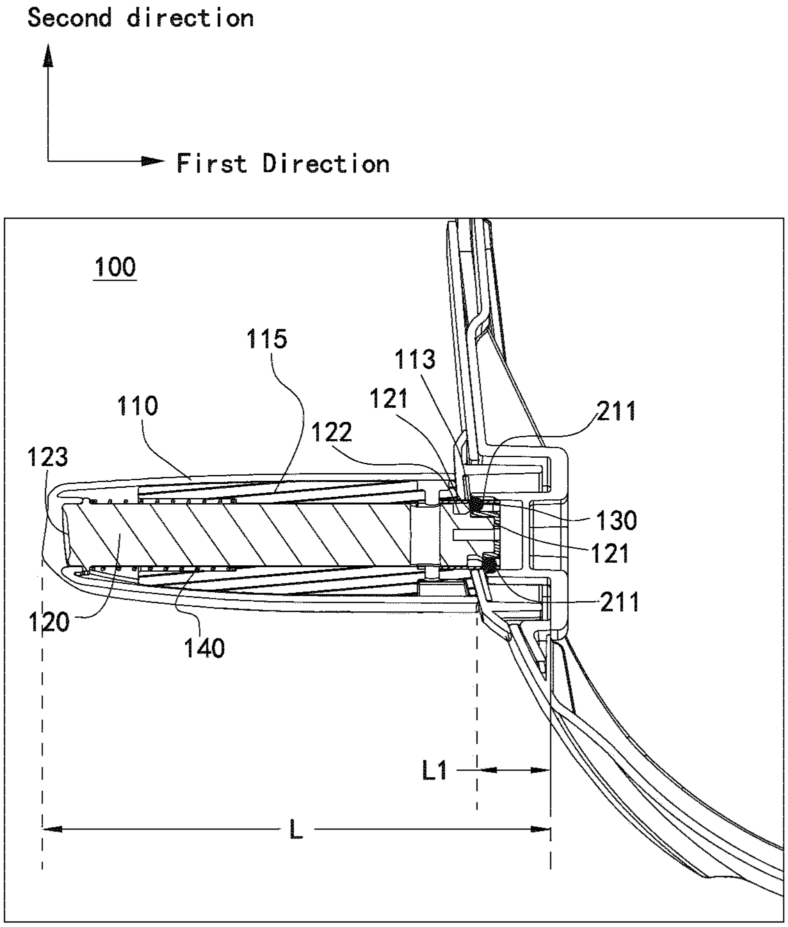
FIG. 8 is a partial sectional view taken along line A-A in FIG. 3, where the side impact protecting block is in a locked state.
Figure 9:
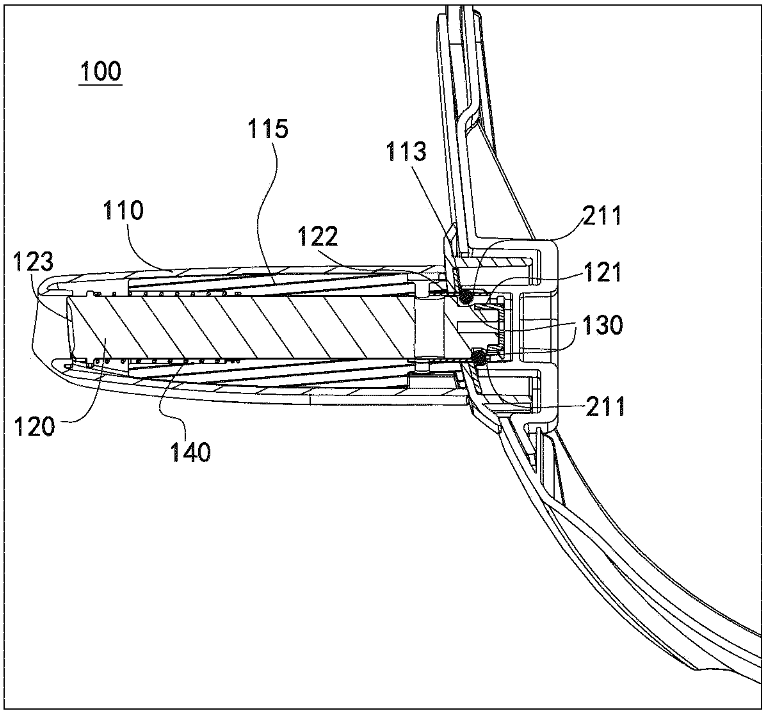
FIG. 9 is a partial sectional view taken along line A-A in FIG. 3, where the side impact protecting block is in an unlocked state.

As shown in FIGS. 8 to 9, a first opening (i.e., longitudinal opening) is provided at the second housing end, so as to allow the slider 120 to be pushed from the outside through the first opening.

The slider 120 is at least partially accommodated in the housing 110 and can be operated from the outside of the housing 110 to slide along the longitudinal direction of the housing 110. The slider 120 has a substantially rectangular shape, and has a first slider end engaged to the engagement member 130 and a second slider end for external operation along the longitudinal direction. It should be understood that the first slider end and the first housing end are ends close to the seat, and the second slider end and the second housing end are ends far away from the seat. A pressing portion 123 is provided at the second slider end so that the user operates the slider 120 through the first opening at the second housing end.

As shown in FIGS. 8 to 9, the slider 120 includes an abutting portion 121 and an avoidance portion 122 adjacent along the longitudinal direction at the first slider end, the abutting portion 121 being closer to the tail end of the first slider end than the avoidance portion 122. As the slider 120 slides, the abutting portion 121 or the avoidance portion 122 can correspond to the position of the engagement hole 113. The transverse dimension of the abutting portion 121 is provided such that when it is located in the position corresponding to the engagement hole 113, the engagement member 130 is pushed against to protrude to the locked position. The transverse dimension of the avoidance portion 122 is provided such that when it is located in the position corresponding to the engagement hole 113, the engagement member 130 is allowed to retract to the release position.

The elastic member 140 acts between the housing 110 and the slider 120 to bias the slider 120 toward the second slider end. An elastic member engagement portion transversely outward protruding is provided at the second slider end. The elastic member 140 is disposed between the elastic member accommodation portion and the elastic member engagement portion.

In this embodiment, the position of the slider 120 away from the seat corresponds to the locked position of the engagement member 130, and the position of the slider 120 close to the seat corresponds to the release position of the engagement member 130. Therefore, the operation of releasing the side impact protecting block 100 moves the slider 120 toward the seat. That is, the sliding of the slider 120 toward the first slider end along the longitudinal direction drives the engagement member 130 to move from the locked position to the release position. However, the unlocked direction of the slider 120 is not limited thereto. In other embodiments, the operation of releasing the side impact protecting block 100 may also moves the slider 120 away from the seat. That is, the sliding of the slider 120 toward the second slider end along the longitudinal direction drives the engagement member 130 to move from the locked position to the release position. In such an embodiment, the avoidance portion 122 is closer to the tail end of the first slider end than the abutting portion 121, the opening is provided on the side of the housing 110 so that the user to push the slider 120 away from the seat, and the elastic member 140 biases the slider 120 toward the first slider end.

The engagement member 130 is accommodated in the housing 110 and located in a longitudinal position of the housing 110, and can move between the locked position protruding out of the housing 110 and the release position retracting into the housing 110 along the transverse direction of the housing 110. The sliding of the slider 120 along the longitudinal direction drives the engagement member 130 to move between the locked position and the release position.

In this embodiment, the sliding direction of the slider 120 (the longitudinal direction) is substantially perpendicular to the moving direction of the engagement member 130 (the transverse direction). However, the present application is not limited thereto. In other embodiments, the sliding direction of the slider 120 may be inclined to the moving direction of the engagement member 130, and the two only need to roughly intersect.

In this embodiment, the engagement member 130 has a spherical shape, and in the housing 110, the diameter of the engagement hole 113 is less than the spherical diameter of the engagement member 130. In this way, the engagement member 130 can only be partially exposed to the outside of the housing 110 through the engagement hole 113, but cannot move through the engagement hole 113. Benefit by the symmetry of the spherical shape, the engagement member 130 does not need to be located along a specific direction, therefore it can roll arbitrarily as it contacts with the slider 120. Moreover, the spherical engagement member 130 is beneficial to reduce the friction between the slider 120 and the housing 110. However, the present application is not limited thereto, and in other embodiments, the engagement member 130 may have other shapes, such as cylindrical or wedge shape.

Figure 6:
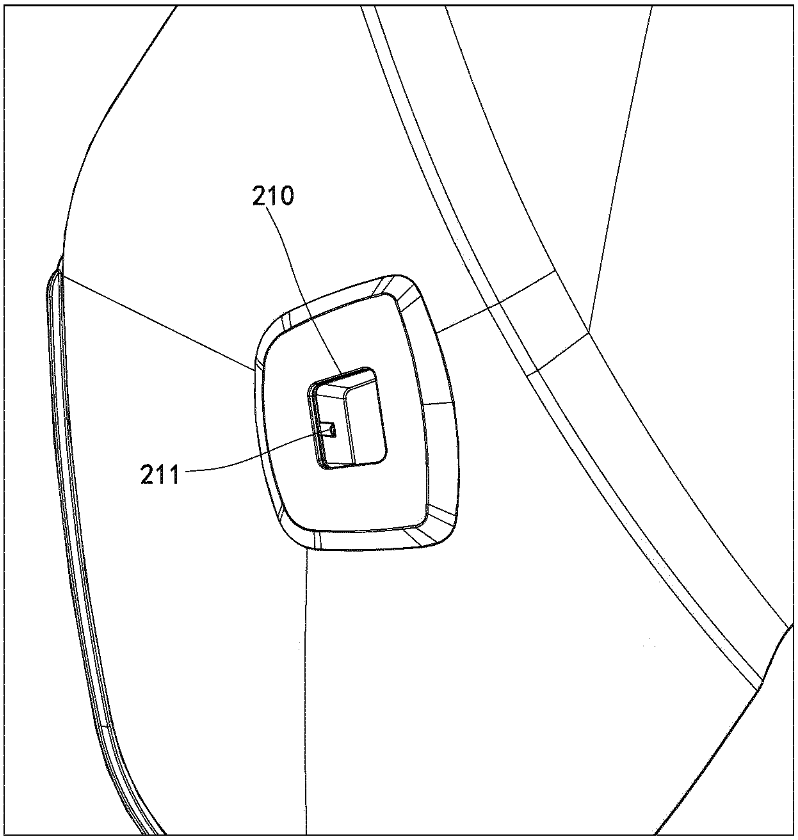
FIG. 6 is a partially enlarged perspective view of the child safety seat according to the present application at a mount viewed from outside.
Figure 7:
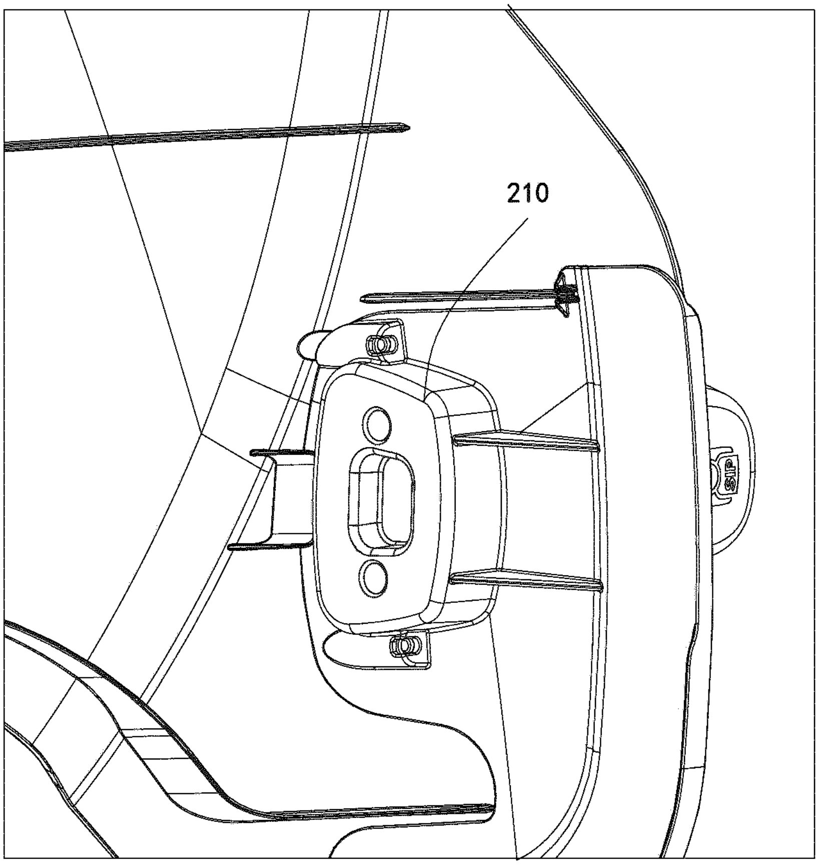
FIG. 7 is a partially enlarged perspective view of the child safety seat according to the present application at the mount viewed from inside.

All or part of the various components of the side impact protecting block 100 may be provided as metal components, so as to improve the performance of the side impact protecting block 100. For example, the abutting portion 121 of the slider 120 may be wrapped by or made of a metal reinforcement. The outer surface of the insertion portion 111 of the housing 110 may be wrapped by or made of a metal reinforcing sheet. The engagement member 130 may be a metallic ball As shown in FIGS. 6 to 7, each mount 210 is recessed toward the inside of the seat along the longitudinal direction, so that the insertion portion 111 of the side impact protecting block 100 is inserted into and located in the mount 210.

An engagement groove 211 transversely recessed is provided on the inner wall of a recessed portion in the position close to the open end of the recessed portion of the mount 210. The position of the engagement groove 211 is provided corresponding to the position of the engagement member 130. The size of the open end is provided such that when the engagement member 130 is located in its locked position, the engagement member 130 is inserted into the engagement groove 211 and is stopped at the open end, thereby fixing the side impact protecting block 100 to the seat; and when the engagement member 130 is located in the release position, the engagement member 130 retracts into the housing 110 and can be free from stopping by the open end.

All or part of various components of the mount 210 may be replaced with metal components, so as to improve the performance of the mount 210. For example, a metal reinforcement sheet is provided on the side where the open end of the mount 210 stops engagement member 130 in the locked position.

Figure 5:
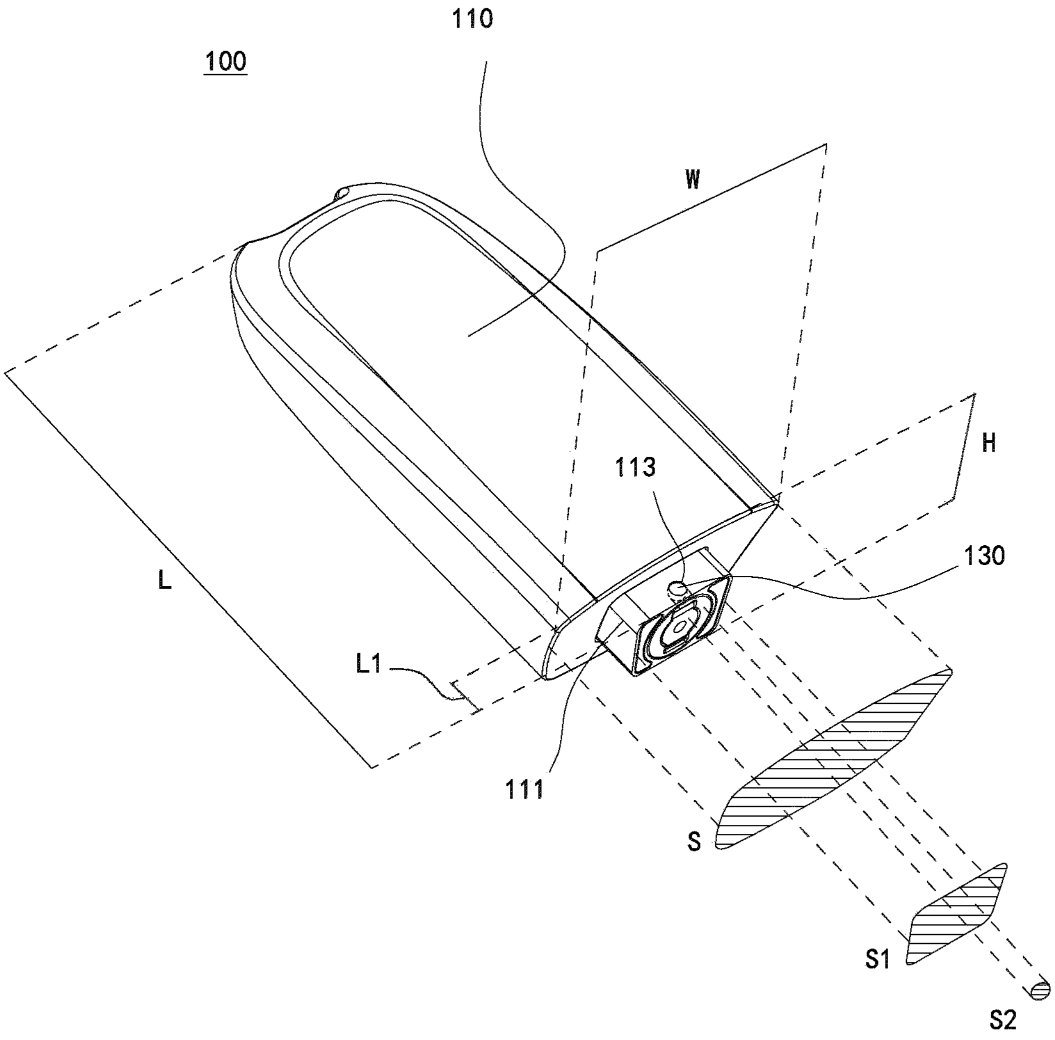

Referring to FIGS. 5 and 8, in one embodiment, a ratio of the overall width W in the second direction to the overall length L in the first direction in the side impact protecting block 100 may be between 1:4 and 1:5. A ratio of the overall width W of the side impact protecting block 100 to the overall thickness H of the side impact protecting block 100 may be between 1:1.5 and 1:2. A ratio of the sectional area S2 of the engagement member 130 in the direction perpendicular to the first direction to the overall sectional area S of the side impact protecting block 100 in the direction perpendicular to the first direction is greater than 1:45. An appropriate size of the sectional area S2 of the engagement member 130 contributes to stable engagement of the side impact protecting block 100 on the child safety seat 200.

The ratio of the length L1 of the insertion portion 111 in the first direction to the overall length L of the side impact protecting block 100 in the first direction may be less than or equal to 1:10. The ratio of the sectional area S1 of the insertion portion 111 in the direction perpendicular to the first direction to the overall sectional area S of the side impact protecting block 100 in the direction perpendicular to the first direction may be between 1:6 and 1:7.

The installation and removal operations of the side impact protecting block 100 according to the first embodiment of the present application will be described.

When installing the side impact protecting block 100 to the seat, the user pushes the slider 120 to the first slider end (release position) through the opening of the housing 110. At this time, the avoidance portion 122 of the slider 120 corresponds to the position of the engagement hole 113, allowing the engagement member 130 to move to the release position. Meanwhile, the user inserts the side impact protecting block 100 into the mount 210. In the insertion process, the engagement member 130 is pressed to the release position by the inner wall of the recessed portion of the mount 210, therefore the movement of the side impact protecting block 100 relative to the mount 210 may not be hindered. After the side impact protecting block 100 is completely inserted into the mount 210, the user no longer pushes the slider 120, therefore the slider 120 returns to the second slider end (locked position) under the bias of the elastic member 140. At this time, the abutting portion 121 of the slider 120 corresponds to the position of the engagement hole 113, and the engagement member 130 is limited in the locked position. Therefore, the engagement member 130 protrudes from the engagement hole 113 and is inserted into the engagement groove 211 of the mount 210, thereby locking the relative movement between the side impact protecting block 100 and the mount 210.

It should be understood that, in the case that the side impact protecting block 100 is not completely inserted into the mount 210, the engagement member 130 cannot be aligned with the engagement slot 211, and thus cannot move into the engagement groove 211, and cannot move to the locked position. In this case, the engagement member 130 may abut against the transition portion between the avoidance portion 122 and the abutting portion 121 of the slider 120, and the abutting portion 121 of the slider 120 is not allowed to move to the position of the engagement hole 113. Therefore, the slider 120 cannot be completely reset. The user can perceive that, the slider 120 is "stuck", thereby knowing that the side impact protecting block 100 fails to be inserted in place. Therefore, the side impact protecting block 100 of the present application provides a warning function for incomplete insertion, which improves safety performance.

When removing the side impact protecting block 100 from the seat, likewise, the user pushes the slider 120 to the first slider end (release position) through the opening of the housing 110. At this time, the avoidance portion 122 of the slider 120 corresponds to the position of the engagement hole 113, allowing the engagement member 130 to move to the release position. Meanwhile, the user pulls out the side impact protecting block 100 from the mount 210. In the pulling out process, the engagement member 130 is pressed to the release position by the inner wall of the recessed portion of the mount 210, therefore the movement of the side impact protecting block 100 relative to the mount 210 may not be hindered. After the side impact protecting block 100 is completely removed, the user no longer pushes the slider 120, therefore the slider 120 returns to the second slider end (the locked position) under the bias of the elastic member 140. At this time, the abutting portion 121 of the slider 120 corresponds to the position of the engagement hole 113, so that the engagement member 130 returns to the locked position.

Figure 10:
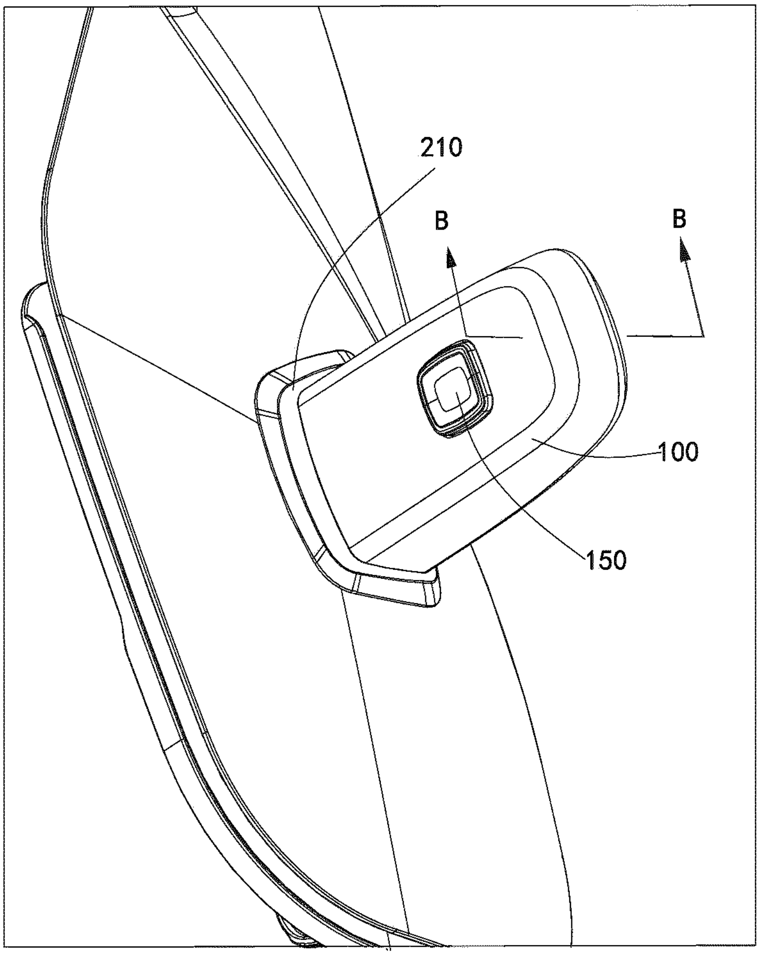
FIG. 10 is a perspective view of a side impact protecting block according to the second embodiment of the present application installed on the child safety seat.
Figure 11:
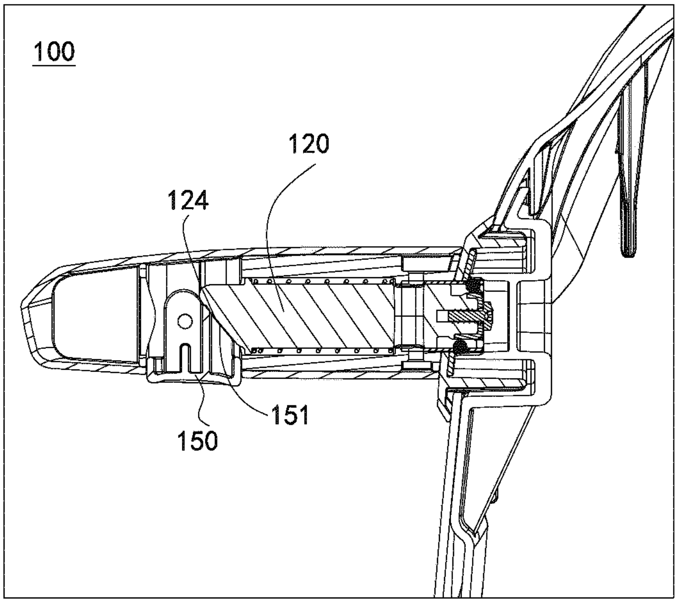
FIG. 11 is a partial sectional view taken along line B-B in FIG. 10, where the side impact protecting block is in the locked state.
Figure 12:
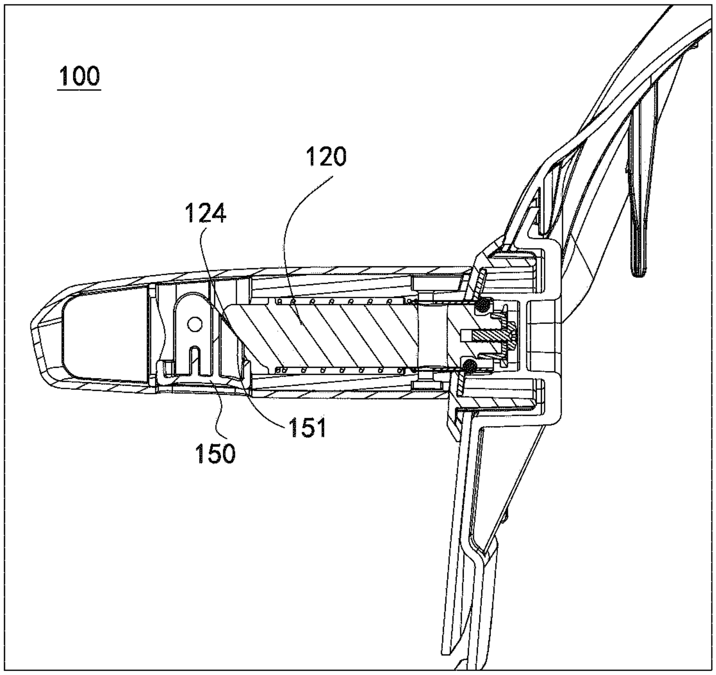
FIG. 12 is a partial sectional view taken along line B-B in FIG. 10, wherein the side impact protecting block is in the unlocked state.

A side impact protecting block 100 according to the second embodiment of the present application will be described with reference to FIGS. 10 to 12.

The side impact protecting block 100 of the second embodiment is substantially the same as that of the first embodiment, the difference lies in the operation mode of the slider 120. Therefore, the similarities between the two will not be elaborated.

In the second embodiment, the side impact protecting block 100 further includes a button 150. The housing 110 is provided with a second opening (i.e., transvers opening) at the second slider end on its side wall, and the button 150 is movably provided at the second opening in the transverse direction relative to the housing 110, so as to allow the button 150 to be pushed from the outside through the second opening. Correspondingly, in this embodiment, the housing 110 does not need to be opened at the second housing end.

The button 150 is provided such that when the user pushes the button 150 from the outside of the housing 110, the button 150 drives the slider 120 to move to the second slider end (i.e., the release position). In the embodiment of the present application, a slider bevel 124 is provided at the second slider end, the button 150 is provided with a button bevel 151, and the button bevel 151 abuts against the slider bevel 124 to convert the transverse movement of the button 150 into the longitudinal movement of the slider 120. However, the present application is not limited thereto, and the button 150 may also be engaged to the slider 120 in other ways.

In conclusion, the present application provides a side impact protecting block, which can be conveniently installed to or removed from the seat, and can provide a locking function relative to the seat. The side impact protecting block of the present application is a removable side impact protection block that is optionally installed according to the user's requirement. Moreover, the side impact protecting block of the present application provides a warning function for incomplete insertion, so that the user notices that the side impact protecting block is not properly installed to the seat.

Although preferred embodiments have been shown and described herein, it should be understood that these embodiments are merely given by way of example. Many variations, changes and substitutions will occur to those skilled in the art without departing from the spirit of the present disclosure. Accordingly, the appended claims are intended to cover all such variations as fall within the spirit and scope of the present disclosure.

LIST OF REFERENCE NUMBERS

100 Side Impact Protecting Block
110 Housing
  111 Insertion Portion
  113 Engagement Hole
  115 Block
120 Slider
  121 Abutting Portion
  122 Avoidance portion
  123 Pressing Portion
  124 Slider Bevel
130 Engagement Member
140 Elastic Member
150 Button
  151 Button Bevel
200 Child Safety Seat
  210 Mount
  211 Engagement Groove
220 Base
230 Seat

What is claimed is:

1. A side impact protecting block, configured to be detachably installed to a child safety seat, wherein the side impact protecting block comprises:

a housing comprising a first housing end and a second housing end along a first direction of the housing;

an insertion portion positioned at the first housing end, the insertion portion having a sectional area (S1) in a direction of the housing that is perpendicular to the first direction that is less than a sectional area (S) of the housing in the direction perpendicular to the first direction;

a slider, at least partially accommodated in the housing, and operable from outside of the housing to slide along the first direction of the housing; and an engagement member, accommodated in the housing, and movable between a locked position protruding out of the housing and a release position retracting into the housing along a second direction of the housing intersecting with the first direction;

wherein sliding of the slider along the first direction drives the engagement member to move between the locked position and the release position.

2. The side impact protecting block according to claim 1, wherein:

the housing is insertable into a side of the child safety seat through the insertion portion; and the engagement member is located in the insertion portion, and protrudes out of the housing through an engagement hole opened on a side wall of the insertion portion.

3. The side impact protecting block according to claim 2, wherein:

the engagement member has a spherical shape, and a diameter of the engagement hole is less than a spherical diameter of the engagement member.

4. The side impact protecting block according to claim 2, wherein:

the insertion portion has a rectangular cross-section, and the engagement hole comprises two engagement holes dislocated along the first direction and respectively opened on two opposite side walls of the insertion portion, the engagement member being provided at a corresponding one of the engagement holes.

5. The side impact protecting block according to claim 2, wherein:

a ratio of a length (L1) of the insertion portion in the first direction to an overall length (L) of the side impact protecting block in the first direction is less than or equal to 1:10; and a ratio of the sectional area (S1) of the insertion portion in the second direction to the sectional area (S) of the housing in the second direction is between 1:6 and 1:7.

6. The side impact protecting block according to claim 2, wherein:

the slider has a first slider end engaged to the engagement member and a second slider end for external operation along the first direction; and the slider is configured, such that sliding of the slider toward the first slider end along the first direction drives the engagement member to move from the locked position to the release position.

7. The side impact protecting block according to claim 6, wherein:

an elastic member is further provided in the housing;

the elastic member is provided between the housing and the slider, being configured to bias the slider toward the second slider end.

8. The side impact protecting block according to claim 7, wherein:

the housing comprises a block provided around the slider, the block is provided with a channel for the slider to move along the first direction, and an elastic member accommodation portion protruding inward along the second direction is provided in the channel;

an elastic member abutting portion protruding outward along the second direction is provided at the second slider end; and the elastic member is provided between the elastic member accommodation portion and the elastic member abutting portion.

9. The side impact protecting block according to claim 6, wherein:

the slider comprises an abutting portion and an avoidance portion adjacent along the first direction at the first slider end, and the abutting portion is closer to a tail end of the first slider end than the avoidance portion; and the slider is configured, such that as the slider slides, the abutting portion or the avoidance portion corresponds to a position of the engagement hole;

when the abutting portion is located in a position corresponding to the engagement hole, the engagement member is pushed against to protrude to the locked position; and when the avoidance portion is located in the position corresponding to the engagement hole, the engagement member is allowed to retract to the release position.

10. The side impact protecting block according to claim 9, wherein:

the housing is opened with a first opening at the second housing end opposite to the first housing end along the first direction, so as to allow the slider to be pushed from outside through the first opening.

11. The side impact protecting block according to claim 9, wherein:

the side impact protecting block further comprises a button;

the housing is opened with a second opening at the second slider end on its side wall, the button is movably disposed at the second opening along the second direction relative to the housing, so as to allow the button to be pushed from outside through the second opening; and a slider bevel is provided at the second slider end, the button is provided with a button bevel, and the button bevel abuts against the slider bevel to change a movement of the button along the second direction into a movement of the slider along the first direction.

12. The side impact protecting block according to claim 9, wherein:

the abutting portion of the slider is wrapped by or made of a metal reinforcement;

an outer surface of the insertion portion of the housing is wrapped by or made of a metal reinforcing sheet; and the engagement member is a metallic ball.

13. The side impact protecting block according to claim 1, wherein:

a ratio of an overall width W in the second direction to an overall length (L) in the first direction of the side impact protecting block, is between 1:4 and 1:5;

a ratio of an overall width (W) of the side impact protecting block to an overall thickness (H) of the side impact protecting block is between 1:1.5 and 1:2; and a ratio of a sectional area (S2) of the engagement member in the second direction to the sectional area (S) of the housing in the second direction is greater than 1:45.

14. The side impact protecting block according to claim 1, wherein the first direction is the longitudinal direction of the side impact protecting block.

15. The side impact protecting block according to claim 1, wherein the slider pushes the engagement member along the second direction when the engagement member is in the locked position.

16. A child safety seat, comprising:

a base, configured to fix the child safety seat to a vehicle;

a seat, for a child to sit on, and at least one side impact protecting block according to claim 1, detachably installed on one side or both sides of the seat.

17. The child safety seat according to claim 16, wherein:

the first direction is substantively perpendicular to a side of the seat, and the second direction is substantively parallel to a side of the seat.

18. The child safety seat according to claim 16, wherein:

each side of the seat is provided with a mount for installing the side impact protecting block, and each mount is recessed toward inside of the seat along the first direction, so that an insertion portion of the side impact protecting block is inserted into and located in the mount; and an engagement groove recessed inward along the second direction is provided on an inner wall of a recessed portion in a position close to an open end of the recessed portion of the mount, and a position of the engagement groove is provided corresponding to a position of the engagement member, wherein when the engagement member is located in its locked position, the engagement member is inserted into the engagement groove and is stopped at the open end, thereby fixing the side impact protecting block to the seat; and when the engagement member is located in the release position, the engagement member retracts into the housing and is free from stopping by the open end.

19. The child safety seat according to claim 18, wherein:

a metal reinforcing sheet is provided on one side where the open end of the mount stops the engagement member in the locked position.

* * * * *